(12) United States Patent
Borowiec et al.

(10) Patent No.: US 10,929,185 B1
(45) Date of Patent: *Feb. 23, 2021

(54) PREDICTIVE WORKLOAD PLACEMENT

(71) Applicant: Pure Storage, Inc., Mountain View, CA (US)

(72) Inventors: Benjamin Borowiec, San Jose, CA (US); Terence Noonan, Vadnais Heights, MN (US)

(73) Assignee: Pure Storage, Inc., Mountain View, CA (US)

( * ) Notice: Subject to any disclaimer, the term of this patent is extended or adjusted under 35 U.S.C. 154(b) by 84 days.

This patent is subject to a terminal disclaimer.

(21) Appl. No.: 15/885,153

(22) Filed: Jan. 31, 2018

Related U.S. Application Data

(63) Continuation of application No. 15/008,521, filed on Jan. 28, 2016, now Pat. No. 9,886,314.

(51) Int. Cl.
*G06F 9/46* (2006.01)
*G06F 9/50* (2006.01)

(52) U.S. Cl.
CPC .................. *G06F 9/5016* (2013.01)

(58) Field of Classification Search
CPC ....................................... G06F 9/52
USPC ....................................... 718/104
See application file for complete search history.

(56) References Cited

U.S. PATENT DOCUMENTS

| | | | |
|---|---|---|---|
| 5,706,210 A | 1/1998 | Kumano et al. | |
| 5,799,200 A | 8/1998 | Brant et al. | |
| 5,933,598 A | 8/1999 | Scales et al. | |
| 6,012,032 A | 1/2000 | Donovan et al. | |
| 6,085,333 A | 7/2000 | DeKoning et al. | |
| 6,643,641 B1 | 11/2003 | Snyder | |
| 6,647,514 B1 | 11/2003 | Umberger et al. | |
| 6,789,162 B1 | 9/2004 | Talagala et al. | |
| 7,089,272 B1 | 8/2006 | Garthwaite et al. | |

(Continued)

FOREIGN PATENT DOCUMENTS

| | | |
|---|---|---|
| EP | 0725324 A2 | 8/1996 |
| WO | WO-2012/087648 A1 | 6/2012 |

(Continued)

OTHER PUBLICATIONS

Paul Sweere, *Creating Storage Class Persistent Memory with NVDIMM*, Published in Aug. 2013, Flash Memory Summit 2013, <http://ww.flashmemorysummit.com/English/Collaterals/Proceedings/2013/20130814_T2_Sweere.pdf>, 22 pages.

(Continued)

*Primary Examiner* — Mehran Kamran

(57) ABSTRACT

Placing workloads in a multi-array system comprising a plurality of storage arrays, including: determining, for each of a plurality of storage arrays, a current system activity level trend of the storage array; receiving a performance profile of a workload to be executed on one of the storage arrays; generating, for each of the plurality of storage arrays in dependence upon the current system activity level trend of the storage array and the performance profile of the workload, a projected system activity level trend for the storage array; identifying, in dependence upon the projected system activity level trend for each of the plurality of storage arrays, an optimal storage array for receiving the workload; and placing the workload on the optimal storage array.

20 Claims, 7 Drawing Sheets

(56) References Cited

U.S. PATENT DOCUMENTS

| | | | |
|---|---|---|---|
| 7,107,389 B2 | 9/2006 | Inagaki et al. | |
| 7,146,521 B1 | 12/2006 | Nguyen | |
| 7,152,142 B1* | 12/2006 | Guha | G06F 3/0625 711/114 |
| 7,334,124 B2 | 2/2008 | Pham et al. | |
| 7,437,530 B1 | 10/2008 | Rajan | |
| 7,493,424 B1 | 2/2009 | Bali et al. | |
| 7,669,029 B1 | 2/2010 | Mishra et al. | |
| 7,689,609 B2 | 3/2010 | Lango et al. | |
| 7,743,191 B1 | 6/2010 | Liao | |
| 7,899,780 B1 | 3/2011 | Shmuylovich et al. | |
| 8,042,163 B1 | 10/2011 | Karr et al. | |
| 8,086,585 B1 | 12/2011 | Brashers et al. | |
| 8,271,700 B1 | 9/2012 | Annem et al. | |
| 8,387,136 B2 | 2/2013 | Lee et al. | |
| 8,437,189 B1 | 5/2013 | Montierth et al. | |
| 8,465,332 B2 | 6/2013 | Hogan et al. | |
| 8,527,544 B1 | 9/2013 | Colgrove et al. | |
| 8,566,546 B1* | 10/2013 | Marshak | G06F 11/3409 711/165 |
| 8,578,442 B1 | 11/2013 | Banerjee | |
| 8,613,066 B1 | 12/2013 | Brezinski et al. | |
| 8,620,970 B2 | 12/2013 | English et al. | |
| 8,688,878 B1* | 4/2014 | Dolan | G06F 3/0649 710/74 |
| 8,751,463 B1 | 6/2014 | Chamness | |
| 8,762,642 B2 | 6/2014 | Bates et al. | |
| 8,769,622 B2 | 7/2014 | Chang et al. | |
| 8,800,009 B1 | 8/2014 | Beda, III et al. | |
| 8,812,860 B1 | 8/2014 | Bray | |
| 8,850,546 B1 | 9/2014 | Field et al. | |
| 8,898,346 B1 | 11/2014 | Simmons | |
| 8,909,854 B2 | 12/2014 | Yamagishi et al. | |
| 8,931,041 B1 | 1/2015 | Banerjee | |
| 8,949,863 B1 | 2/2015 | Coatney et al. | |
| 8,984,602 B1 | 3/2015 | Bailey et al. | |
| 8,990,905 B1 | 3/2015 | Bailey et al. | |
| 9,124,569 B2 | 9/2015 | Hussain et al. | |
| 9,134,922 B2 | 9/2015 | Rajagopal et al. | |
| 9,209,973 B2 | 12/2015 | Aikas et al. | |
| 9,250,823 B1 | 2/2016 | Kamat et al. | |
| 9,300,660 B1 | 3/2016 | Borowiec et al. | |
| 9,342,349 B2* | 5/2016 | Nandyalam | G06F 9/4893 |
| 9,354,813 B1* | 5/2016 | Dolan | G06F 3/061 |
| 9,444,822 B1 | 9/2016 | Borowiec et al. | |
| 9,454,321 B1* | 9/2016 | Smaldone | G06F 3/0653 |
| 9,507,532 B1 | 11/2016 | Colgrove et al. | |
| 9,507,887 B1* | 11/2016 | Wang | G06F 3/0685 |
| 2002/0013802 A1 | 1/2002 | Mori et al. | |
| 2003/0145172 A1 | 7/2003 | Galbraith et al. | |
| 2003/0191783 A1 | 10/2003 | Wolczko et al. | |
| 2003/0225961 A1 | 12/2003 | Chow et al. | |
| 2004/0080985 A1 | 4/2004 | Chang et al. | |
| 2004/0111573 A1 | 6/2004 | Garthwaite | |
| 2004/0153844 A1 | 8/2004 | Ghose et al. | |
| 2004/0193814 A1 | 9/2004 | Erickson et al. | |
| 2004/0260967 A1 | 12/2004 | Guha et al. | |
| 2004/0267553 A1* | 12/2004 | Brunton | G06F 16/10 718/105 |
| 2005/0138170 A1* | 6/2005 | Cherkasova | H04L 41/145 709/225 |
| 2005/0160416 A1 | 7/2005 | Jamison | |
| 2005/0188246 A1 | 8/2005 | Emberty et al. | |
| 2005/0216800 A1 | 9/2005 | Bicknell et al. | |
| 2006/0015771 A1 | 1/2006 | Van Gundy et al. | |
| 2006/0129817 A1 | 6/2006 | Borneman et al. | |
| 2006/0161726 A1 | 7/2006 | Lasser | |
| 2006/0230245 A1 | 10/2006 | Gounares et al. | |
| 2006/0239075 A1 | 10/2006 | Williams et al. | |
| 2006/0259621 A1* | 11/2006 | Ranganathan | H04L 67/1002 709/226 |
| 2007/0022227 A1 | 1/2007 | Miki | |
| 2007/0028068 A1 | 2/2007 | Golding et al. | |
| 2007/0055702 A1 | 3/2007 | Fridella et al. | |
| 2007/0109856 A1 | 5/2007 | Pellicone et al. | |
| 2007/0150689 A1 | 6/2007 | Pandit et al. | |
| 2007/0168321 A1 | 7/2007 | Saito et al. | |
| 2007/0220227 A1 | 9/2007 | Long | |
| 2007/0294563 A1 | 12/2007 | Bose | |
| 2007/0294564 A1 | 12/2007 | Reddin et al. | |
| 2008/0005587 A1 | 1/2008 | Ahlquist | |
| 2008/0077825 A1 | 3/2008 | Bello et al. | |
| 2008/0162674 A1 | 7/2008 | Dahiya | |
| 2008/0174426 A1* | 7/2008 | Hackworth | G06F 3/0653 340/540 |
| 2008/0195833 A1 | 8/2008 | Park | |
| 2008/0270678 A1 | 10/2008 | Cornwell et al. | |
| 2008/0282045 A1 | 11/2008 | Biswas et al. | |
| 2009/0077340 A1* | 3/2009 | Johnson | G06F 3/067 711/171 |
| 2009/0100115 A1 | 4/2009 | Park et al. | |
| 2009/0198889 A1 | 8/2009 | Ito et al. | |
| 2009/0259345 A1* | 10/2009 | Kato | G06F 1/20 700/295 |
| 2009/0276202 A1* | 11/2009 | Susarla | H04L 41/145 703/21 |
| 2009/0276203 A1* | 11/2009 | Everhart | G06F 11/3457 703/21 |
| 2010/0052625 A1 | 3/2010 | Cagno et al. | |
| 2010/0211723 A1 | 8/2010 | Mukaida | |
| 2010/0246266 A1 | 9/2010 | Park et al. | |
| 2010/0257142 A1 | 10/2010 | Murphy et al. | |
| 2010/0262764 A1 | 10/2010 | Liu et al. | |
| 2010/0325345 A1 | 12/2010 | Ohno et al. | |
| 2010/0332754 A1 | 12/2010 | Lai et al. | |
| 2011/0072290 A1 | 3/2011 | Davis et al. | |
| 2011/0125955 A1 | 5/2011 | Chen | |
| 2011/0131231 A1 | 6/2011 | Haas et al. | |
| 2011/0167221 A1 | 7/2011 | Pangal et al. | |
| 2012/0023144 A1 | 1/2012 | Rub | |
| 2012/0054264 A1 | 3/2012 | Haugh et al. | |
| 2012/0079318 A1 | 3/2012 | Colgrove et al. | |
| 2012/0102291 A1* | 4/2012 | Cherian | G06F 3/067 711/170 |
| 2012/0110260 A1* | 5/2012 | Chavda | G06F 3/0689 711/114 |
| 2012/0131253 A1 | 5/2012 | McKnight et al. | |
| 2012/0303919 A1 | 11/2012 | Hu et al. | |
| 2012/0311000 A1 | 12/2012 | Post et al. | |
| 2013/0007845 A1 | 1/2013 | Chang et al. | |
| 2013/0031414 A1 | 1/2013 | Dhuse et al. | |
| 2013/0036272 A1 | 2/2013 | Nelson | |
| 2013/0071087 A1 | 3/2013 | Motiwala et al. | |
| 2013/0090751 A1* | 4/2013 | Harber | H03G 3/3089 700/94 |
| 2013/0145447 A1 | 6/2013 | Maron | |
| 2013/0191555 A1 | 7/2013 | Liu | |
| 2013/0198459 A1 | 8/2013 | Joshi et al. | |
| 2013/0205173 A1 | 8/2013 | Yoneda | |
| 2013/0219164 A1 | 8/2013 | Hamid | |
| 2013/0227201 A1 | 8/2013 | Talagala et al. | |
| 2013/0290607 A1 | 10/2013 | Chang et al. | |
| 2013/0311434 A1 | 11/2013 | Jones | |
| 2013/0318297 A1 | 11/2013 | Jibbe et al. | |
| 2013/0332614 A1 | 12/2013 | Brunk et al. | |
| 2014/0020083 A1 | 1/2014 | Fetik | |
| 2014/0074850 A1 | 3/2014 | Noel et al. | |
| 2014/0082715 A1 | 3/2014 | Grajek et al. | |
| 2014/0086146 A1 | 3/2014 | Kim et al. | |
| 2014/0090009 A1 | 3/2014 | Li et al. | |
| 2014/0096220 A1 | 4/2014 | Da Cruz Pinto et al. | |
| 2014/0101434 A1 | 4/2014 | Senthurpandi et al. | |
| 2014/0130055 A1* | 5/2014 | Guha | G06F 3/0665 718/104 |
| 2014/0164774 A1 | 6/2014 | Nord et al. | |
| 2014/0173232 A1 | 6/2014 | Reohr et al. | |
| 2014/0195636 A1 | 7/2014 | Karve et al. | |
| 2014/0201512 A1 | 7/2014 | Seethaler et al. | |
| 2014/0201541 A1 | 7/2014 | Paul et al. | |
| 2014/0208155 A1 | 7/2014 | Pan | |
| 2014/0215590 A1 | 7/2014 | Brand | |
| 2014/0229654 A1 | 8/2014 | Goss et al. | |

(56) References Cited

U.S. PATENT DOCUMENTS

| | | |
|---|---|---|
| 2014/0230017 A1 | 8/2014 | Saib |
| 2014/0258526 A1 | 9/2014 | Le Sant et al. |
| 2014/0282983 A1 | 9/2014 | Ju et al. |
| 2014/0285917 A1 | 9/2014 | Cudak et al. |
| 2014/0325262 A1 | 10/2014 | Cooper et al. |
| 2014/0351627 A1 | 11/2014 | Best et al. |
| 2014/0373104 A1 | 12/2014 | Gaddam et al. |
| 2014/0373126 A1 | 12/2014 | Hussain et al. |
| 2015/0026387 A1 | 1/2015 | Sheredy et al. |
| 2015/0067294 A1* | 3/2015 | Hu ................. G06F 3/0653 711/170 |
| 2015/0074463 A1 | 3/2015 | Jacoby et al. |
| 2015/0089569 A1 | 3/2015 | Sondhi et al. |
| 2015/0095515 A1 | 4/2015 | Krithivas et al. |
| 2015/0113203 A1 | 4/2015 | Dancho et al. |
| 2015/0121137 A1 | 4/2015 | McKnight et al. |
| 2015/0134920 A1 | 5/2015 | Anderson et al. |
| 2015/0149822 A1 | 5/2015 | Coronado et al. |
| 2015/0193169 A1 | 7/2015 | Sundaram et al. |
| 2015/0236896 A1* | 8/2015 | Brown ................. H04L 43/08 709/201 |
| 2015/0236978 A1* | 8/2015 | Gulati ................. G06F 9/5044 709/226 |
| 2015/0242133 A1* | 8/2015 | Smith ................. G06F 3/0632 711/114 |
| 2015/0301853 A1* | 10/2015 | Nandyalam ............ G06F 9/505 718/105 |
| 2015/0378888 A1 | 12/2015 | Zhang et al. |
| 2016/0087910 A1* | 3/2016 | Mittal ................. H04L 67/32 709/226 |
| 2016/0098323 A1 | 4/2016 | Mutha et al. |
| 2016/0140208 A1* | 5/2016 | Dang ................. G06F 16/90 707/737 |
| 2016/0321008 A1* | 11/2016 | Fang ................. G06F 3/061 |
| 2016/0349992 A1* | 12/2016 | Basak ................. G06F 3/0653 |
| 2016/0350009 A1 | 12/2016 | Cerreta et al. |
| 2016/0352720 A1 | 12/2016 | Hu et al. |
| 2016/0352830 A1 | 12/2016 | Borowiec et al. |
| 2016/0352834 A1 | 12/2016 | Borowiec et al. |
| 2016/0366223 A1* | 12/2016 | Mason ............... H04L 41/0816 |
| 2017/0068473 A1* | 3/2017 | Anglin ................. G06F 3/0689 |
| 2017/0220387 A1 | 8/2017 | Borowiec et al. |

FOREIGN PATENT DOCUMENTS

| | | |
|---|---|---|
| WO | WO-2013071087 A1 | 5/2013 |
| WO | WO-2014/110137 A1 | 7/2014 |
| WO | WO-2016/015008 A1 | 12/2016 |
| WO | WO-2016/190938 A1 | 12/2016 |
| WO | WO-2016/195759 A1 | 12/2016 |
| WO | WO-2016/195958 A1 | 12/2016 |
| WO | WO-2016/195961 A1 | 12/2016 |
| WO | WO-2017/131828 A1 | 8/2017 |

OTHER PUBLICATIONS

PCMAG, *Storage Array Definition*, Published May 10, 2013. <http://web.archive.org/web/20130510121646/http://www.pcmag.com/encyclopedia/term/52091/storage-array>, 2 pages.

Google Search of "storage array define" performed by the Examiner on Nov. 4, 2015 for U.S. Appl. No. 14/725,278, Results limited to entries dated before 2012, 1 page.

Techopedia, *What is a disk array*, techopedia.com (online), Jan. 13, 2012, 1 page, URL: web.archive.org/web/20120113053358/http://www.techopedia.com/definition/1009/disk-array.

Webopedia, *What is a disk array*, webopedia.com (online), May 26, 2011, 2 pages, URL: web/archive.org/web/20110526081214/http://www.webopedia.com/TERM/D/disk_array.html.

Li et al., *Access Control for the Services Oriented Architecture*, Proceedings of the 2007 ACM Workshop on Secure Web Services (SWS '07), Nov. 2007, pp. 9-17, ACM New York, NY.

Hota et al., *Capability-based Cryptographic Data Access Control in Cloud Computing*, International Journal of Advanced Networking and Applications, col. 1, Issue 1, Aug. 2011, 10 pages, Eswar Publications, India.

Faith, *dictzip file format*, GitHub.com (online), accessed Jul. 28, 2015, 1 page, URL: github.com/fidlej/idzip.

Wikipedia, *Convergent Encryption*, Wikipedia.org (online), accessed Sep. 8, 2015, 2 pages, URL: en.wikipedia.org/wiki/Convergent_encryption.

Storer et al., *Secure Data Deduplication*, Proceedings of the 4th ACM International Workshop on Storage Security And Survivability (StorageSS'08), Oct. 2008, 10 pages, ACM New York, NY. USA, DOI: 10.1145/1456469.1456471.

ETSI, *Network Function Virtualisation (NFV); Resiliency Requirements*, ETSI GS NFCV-REL 001, V1.1.1, Jan. 2015, 82 pages, etsi.org (online), URL:.

Microsoft, *Hybrid for SharePoint Server 2013—Security Reference Architecture*, Microsoft (online), Oct. 2014, 53 pages, URL: hybrid.office.com/img/Security_Reference_Architecture.pdf.

Microsoft, *Hybrid Identity*, Microsoft (online), Apr. 2014, 36 pages, URL: www.aka.ms/HybridIdentityWp.

Microsoft, *Hybrid Identity Management*, Microsoft (online), Apr. 2014, 17 pages, URL: download.microsoft.com/download/E/A/E/EAE57CD1-A80B-423C-96BB-142FAAC630B9/Hybrid_Identity_Datasheet.pdf.

Bellamy-McIntyre et al., *OpenID and the Enterprise: A Model-based Analysis of Single Sign-On Authentication*, 15th IEEE International Enterprise Distributed Object Computing Conference (EDOC), Aug. 29, 2011, pp. 129-138, IEEE Computer Society, USA, DOI: 10.1109/EDOC.2011.26, ISBN: 978-1-4577-0362-1.

Kong, *Using PCI Express As the Primary System Interconnect in Multiroot Compute, Storage, Communications and Embedded Systems*, White Paper, IDT.com (online), Aug. 28, 2008, 12 pages, URL: www.idt.com/document/whp/idt-pcie-multi-root-white-paper.

Hu et al., *Container Marking: Combining Data Placement, Garbage Collection and Wear Levelling for Flash*, 19th.Annual IEEE International Symposium on Modelling, Analysis, and Simulation of Computer and Telecommunications Systems, Jul. 25-27, 2011, 11 pages, ISBN: 978-0-7695-4430-4, DOI: 10.1109/MASCOTS.2011.50.

International Search Report and Written Opinion, PCT/US2016/015006, dated Jul. 18, 2016, 12 pages.

International Search Report and Written Opinion, PCT/US2016/015008, dated May 4, 2016, 12 pages.

International Search Report and Written Opinion, PCT/US2016/020410, dated Jul. 8, 2016, 12 pages.

International Search Report and Written Opinion, PCT/US2016/032084, dated Jul. 18, 2016, 12 pages.

International Search Report and Written Opinion, PCT/US2016/016333, dated Jun. 8, 2016, 12 pages.

International Search Report and Written Opinion, PCT/US2016/032052, dated Aug. 30, 2016, 17 pages.

International Search Report and Written Opinion, PCT/US2016/035492, dated Aug. 17, 2016, 10 pages.

International Search Report and Written Opinion, PCT/US2016/036693, dated Aug. 29, 2016, 10 pages.

International Search Report and Written Opinion, PCT/US2016/038758, dated Oct. 7, 2016, 10 pages.

International Search Report and Written Opinion, PCT/US2016/040393, dated Sep. 22, 2016, 10 pages.

International Search Report and Written Opinion, PCT/US2016/044020, dated Sep. 30, 2016, 11 pages.

International Search Report and Written Opinion, PCT/US2016/044874, dated Oct. 7, 2016, 11 pages.

International Search Report and Written Opinion, PCT/US2016/044875, dated Oct. 5, 2016, 13 pages.

International Search Report and Written Opinion, PCT/US2016/044876, dated Oct. 21, 2016, 12 pages.

International Search Report and Written Opinion, PCT/US2016/059789, dated Apr. 19, 2017, 11 pages.

(56) References Cited

OTHER PUBLICATIONS

International Search Report and Written Opinion, PCT/US2016/044877, dated Sep. 29, 2016, 13 pages.

* cited by examiner

PREDICTIVE WORKLOAD PLACEMENT

CROSS-REFERENCE TO RELATED APPLICATION

This application is a continuation application of U.S. patent application Ser. No. 15/008,521, filed Jan. 28, 2016.

BACKGROUND OF THE INVENTION

Field of the Invention

The field of the invention is data processing, or, more specifically, methods, apparatus, and products for placing workloads in a multi-array system.

Description of Related Art

Enterprise storage systems can include a plurality of storage devices that are organized in many ways and even located in distinct locations. As such enterprise storage systems grow in scale, managing such enterprise storage systems can become increasingly difficult. In fact, the responsibility for managing such storage systems can become distributed amongst many actors in many locations, making attempts to coordinate management of the storage system very difficult.

SUMMARY OF THE INVENTION

Methods, apparatuses, and products for placing workloads in a multi-array system comprising a plurality of storage arrays, including: determining, for each of a plurality of storage arrays, a current system activity level trend of the storage array, the current system activity level trend including a plurality of performance metrics of the storage array; receiving a performance profile of a workload to be executed on one of the storage arrays; generating, for each of the plurality of storage arrays in dependence upon the current system activity level trend of the storage array and the performance profile of the workload, a projected system activity level trend for the storage array, wherein the projected system activity level trend identifies an expected impact to the performance metrics of the storage array created by placing the workload on the storage array; identifying, in dependence upon the projected system activity level trend for each of the plurality of storage arrays, an optimal storage array for receiving the workload; and placing the workload on the optimal storage array.

The foregoing and other objects, features and advantages of the invention will be apparent from the following more particular descriptions of example embodiments of the invention as illustrated in the accompanying drawings wherein like reference numbers generally represent like parts of example embodiments of the invention.

DETAILED DESCRIPTION OF EXAMPLE EMBODIMENTS

Figure 1:
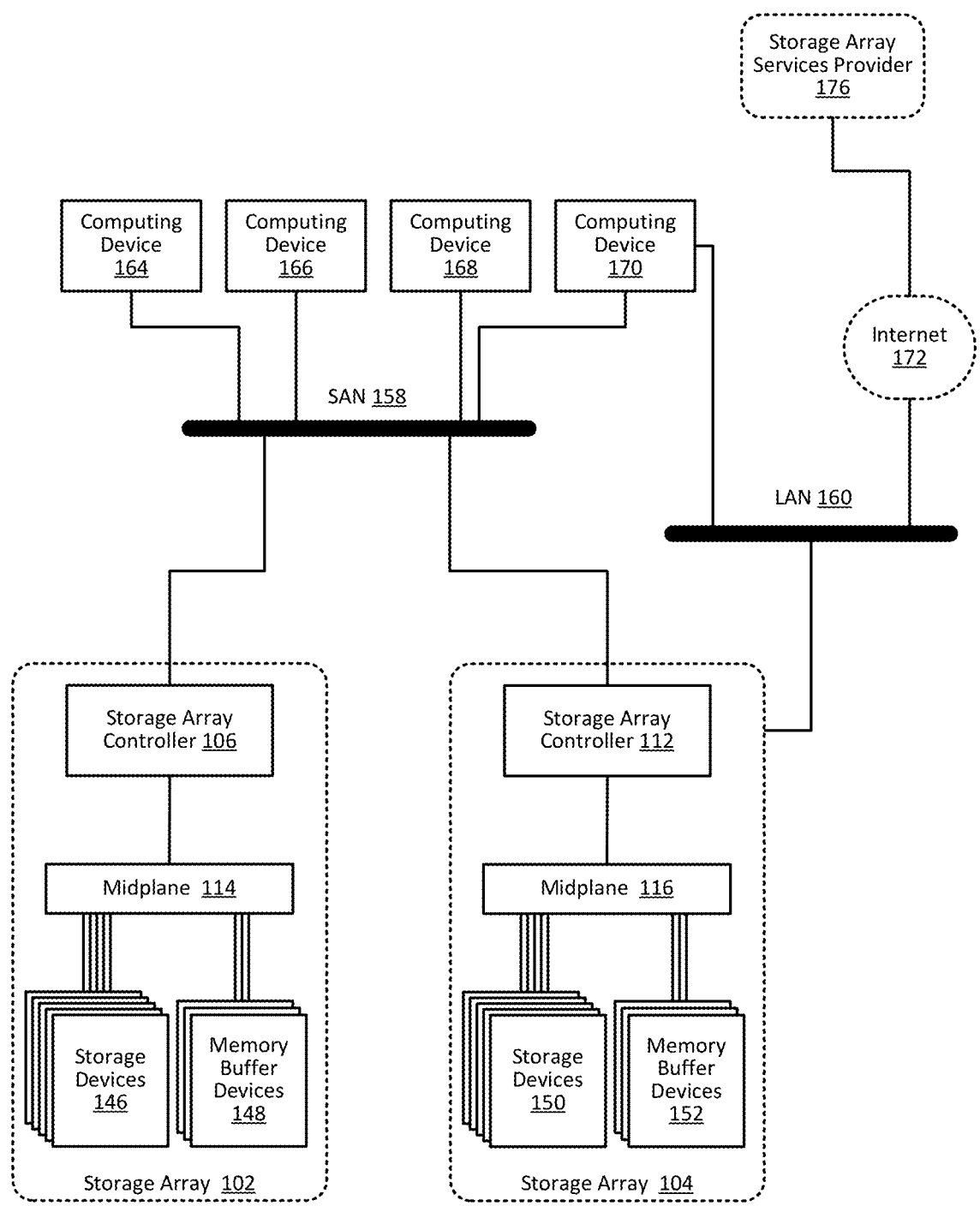
FIG. 1 sets forth a block diagram of a multi-array system in which workloads are placed according to embodiments of the present disclosure.

Example methods, apparatuses, and products for placing workloads in a multi-array system in accordance with the present disclosure are described with reference to the accompanying drawings, beginning with FIG. 1. FIG. 1 sets forth a block diagram of a multi-array system in which workloads are placed according to embodiments of the present disclosure. The system of FIG. 1 includes a number of computing devices (164, 166, 168, 170). The computing devices (164, 166, 168, 170) depicted in FIG. 1 may be implemented in a number of different ways. For example, the computing devices (164, 166, 168, 170) depicted in FIG. 1 may be embodied as a server in a data center, a workstation, a personal computer, a notebook, or the like.

The computing devices (164, 166, 168, 170) in the example of FIG. 1 are coupled for data communications to a number of storage arrays (102, 104) through a storage area network (SAN') (158) as well as a local area network (160) ('LAN'). The SAN (158) may be implemented with a variety of data communications fabrics, devices, and protocols. Example fabrics for such a SAN (158) may include Fibre Channel, Ethernet, Infiniband, Serial Attached Small Computer System Interface ('SAS'), and the like. Example data communications protocols for use in such a SAN (158) may include Advanced Technology Attachment ('ATA'), Fibre Channel Protocol, SCSI, iSCSI, HyperSCSI, and others. Readers of skill in the art will recognize that a SAN is just one among many possible data communications couplings which may be implemented between a computing device (164, 166, 168, 170) and a storage array (102, 104). For example, the storage devices (146, 150) within the storage arrays (102, 104) may also be coupled to the computing devices (164, 166, 168, 170) as network attached storage ('NAS') capable of facilitating file-level access, or even using a SAN-NAS hybrid that offers both file-level protocols and block-level protocols from the same system. Any other such data communications coupling is well within the scope of embodiments of the present disclosure.

The local area network (160) of FIG. 1 may also be implemented with a variety of fabrics and protocols. Examples of such fabrics include Ethernet (802.3), wireless (802.11), and the like. Examples of such data communications protocols include Transmission Control Protocol ('TCP'), User Datagram Protocol ('UDP'), Internet Protocol ('IP'), HyperText Transfer Protocol ('HTTP'), Wireless Access Protocol ('WAP'), Handheld Device Transport Protocol ('HDTP'), Session Initiation Protocol ('SIP'), Real Time Protocol ('RTP') and others as will occur to those of skill in the art.

The example storage arrays (102, 104) of FIG. 1 provide persistent data storage for the computing devices (164, 166, 168, 170). The example storage arrays (102, 104) of FIG. 1 may provide persistent data storage for the computing devices (164, 166, 168, 170), at least in part, through the use of a plurality of storage devices (146, 150). A 'storage device' as the term is used in this specification refers to any device configured to record data persistently. The term 'persistently' as used here refers to a device's ability to maintain recorded data after loss of a power source. Examples of storage devices may include mechanical, spinning hard disk drives, Solid-state drives (e.g., "Flash drives"), and the like.

Each storage array (102, 104) depicted in FIG. 1 includes a storage array controller (106, 112). Each storage array controller (106, 112) may be embodied as a module of automated computing machinery comprising computer hardware, computer software, or a combination of computer hardware and software. The storage array controllers (106, 112) may be configured to carry out various storage-related tasks. Such tasks may include writing data received from the one or more of the computing devices (164, 166, 168, 170) to storage, erasing data from storage, retrieving data from storage to provide the data to one or more of the computing devices (164, 166, 168, 170), monitoring and reporting of disk utilization and performance, performing RAID (Redundant Array of Independent Drives) or RAID-like data redundancy operations, compressing data, encrypting data, and so on.

Each storage array controller (106, 112) may be implemented in a variety of ways, including as a Field Programmable Gate Array ('FPGA'), a Programmable Logic Chip ('PLC'), an Application Specific Integrated Circuit ('ASIC'), or computing device that includes discrete components such as a central processing unit, computer memory, and various adapters. Each storage array controller (106, 112) may include, for example, a data communications adapter configured to support communications via the SAN (158) and the LAN (160). Although only one of the storage array controllers (112) in the example of FIG. 1 is depicted as being coupled to the LAN (160) for data communications, readers will appreciate that both storage array controllers (106, 112) may be independently coupled to the LAN (160). Each storage array controller (106, 112) may also include, for example, an I/O controller or the like that couples the storage array controller (106, 112) for data communications, through a midplane (114, 116) to a number of storage devices (146, 150). Readers will appreciate that although the example depicted in FIG. 1 includes an embodiment where the storage array controller (106, 112) is communicatively coupled the storage devices (146, 150) via a midplane (114), other forms of interconnects may be utilized to facilitate communications between the storage array controller (106, 112) and the storage devices (146, 150).

In addition to being coupled to the computing devices through the SAN (158), the storage arrays (102, 104) may also be coupled to the computing devices through the LAN (160) and to one or more cloud service providers through the Internet (172). The term 'cloud' as used in this specification refers to systems and computing environments that provide services to user devices through the sharing of computing resources through a network. Generally, the user device is unaware of the exact computing resources utilized by the cloud system to provide the services. Although in many cases such 'cloud' environments or systems are accessible via the Internet, readers of skill in the art will recognize that any system that abstracts the use of shared resources to provide services to a user through any network may be considered a cloud-based system.

One example cloud service in FIG. 1 is a storage array services provider (176). The storage array service provider (176) may be configured to provide various storage array services such as reporting of storage array performance characteristics, configuration control of the storage arrays, and the like. The storage array services provider may rely on modules executing on the storage array itself to gather or process such data.

The system of FIG. 1 may be configured, according to embodiments of the present disclosure, to place workloads in a multi-array system. Placing workloads in a multi-array system may be carried out by the storage array services provider (176) performing the steps of: determining, for each of a plurality of storage arrays, a current system activity level trend of the storage array, the current system activity level trend including a plurality of performance metrics of the storage array; receiving a performance profile of a workload to be executed on one of the storage arrays; generating, for each of the plurality of storage arrays in dependence upon the current system activity level trend of the storage array and the performance profile of the workload, a projected system activity level trend for the storage array, wherein the projected system activity level trend identifies an expected impact to the performance metrics of the storage array created by placing the workload on the storage array; identifying, in dependence upon the projected system activity level trend for each of the plurality of storage arrays, an optimal storage array for receiving the workload; and placing the workload on the optimal storage array, as will be described in greater detail below. Readers will appreciate that although placing workloads in a multi-array system is described in FIG. 1 as being carried out by the storage array services provider (176), other embodiments are envisioned where placing workloads in a multi-array system is carried out by one or more other devices. For example, placing workloads in a multi-array system may be carried out by a dedicated server that is included as part of a particular storage array, by a dedicated server that serves as a multi-array manager, and so on.

The arrangement of computing devices, storage arrays, networks, and other devices making up the example system illustrated in FIG. 1 are for explanation, not for limitation. Systems useful according to various embodiments of the present disclosure may include different configurations of servers, routers, switches, computing devices, and network architectures, not shown in FIG. 1, as will occur to those of skill in the art.

Placing workloads in a multi-array system in accordance with embodiments of the present disclosure is generally implemented with computers. In the system of FIG. 1, for example, all the computing devices (164-170), storage controllers (106, 112), and storage array services provider (176) may be implemented, to some extent at least, as computers. For further explanation, therefore, FIG. 2 sets forth a block diagram of several example computers useful for placing workloads in a multi-array system according to embodiments of the present disclosure. The example computers in FIG. 2 include a storage array services provider (176).

Figure 2:
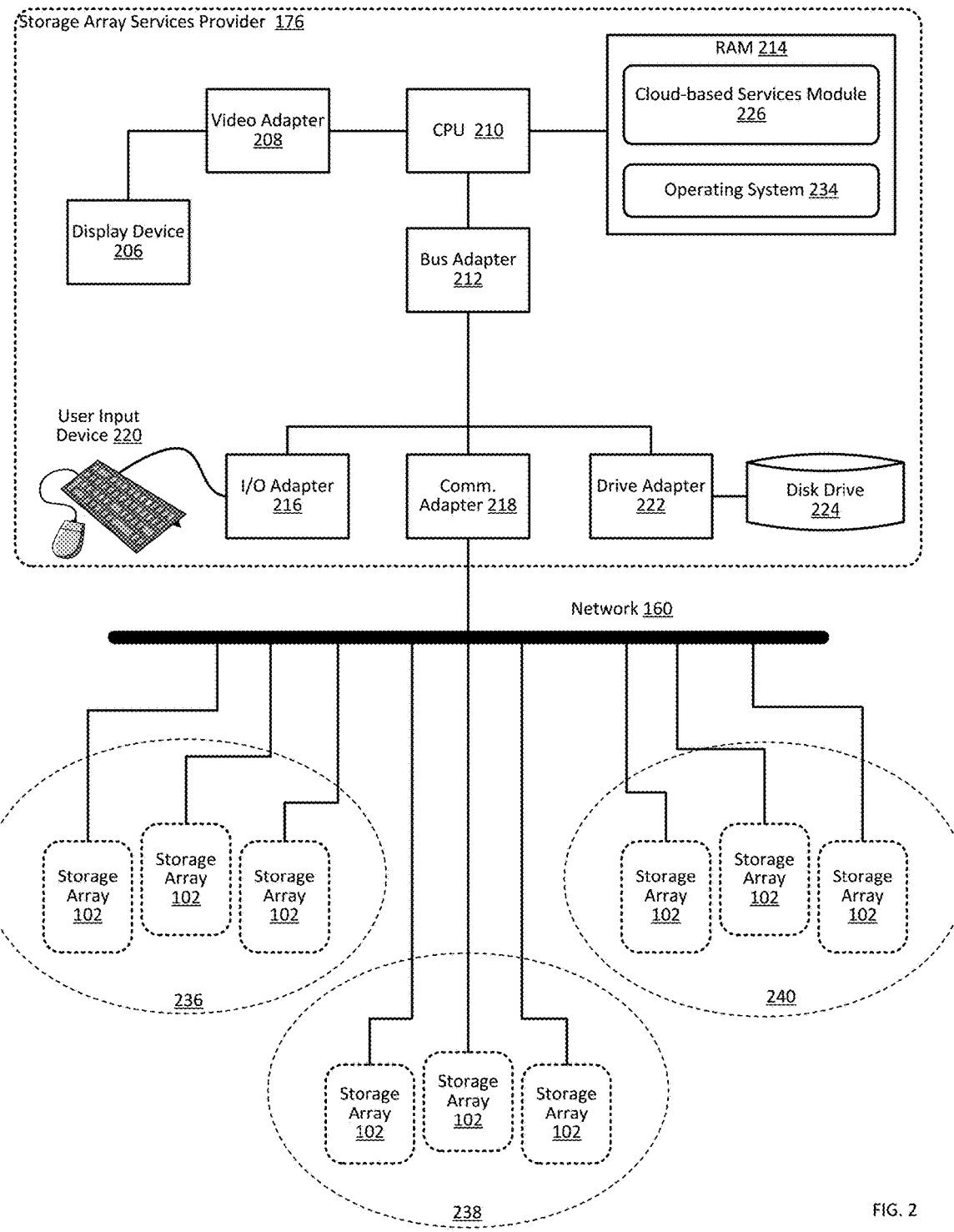
FIG. 2 sets forth a block diagram of several example computers useful for placing workloads in a multi-array system according to embodiments of the present disclosure.

The storage array services provider (176) of FIG. 2 includes at least one computer processor (210) or 'CPU' as well as random access memory (214) (RAM') which is connected through a high speed memory bus and bus adapter (212) to processor (210) and to other components of the storage array services provider (176). Stored in RAM (214) is a cloud-based services module (226), a module of computer program instructions that when executed causes the storage array services provider (176) to place workloads in a multi-array system. The cloud-based services module (226) may be configured for: determining, for each of a plurality of storage arrays, a current system activity level trend of the storage array, the current system activity level trend including a plurality of performance metrics of the storage array; receiving a performance profile of a workload to be executed on one of the storage arrays; generating, for each of the plurality of storage arrays in dependence upon the current system activity level trend of the storage array and the performance profile of the workload, a projected system activity level trend for the storage array, wherein the projected system activity level trend identifies an expected impact to the performance metrics of the storage array created by placing the workload on the storage array; identifying, in dependence upon the projected system activity level trend for each of the plurality of storage arrays, an optimal storage array for receiving the workload; and placing the workload on the optimal storage array, as will be described in greater detail below.

Also stored in RAM (214) of the example storage array services provider (176) is an operating system (234). Examples of operating systems useful in computers configured for placing workloads in a multi-array system according to embodiments of the present disclosure include UNIX™, Linux™, Microsoft Windows™, and others as will occur to those of skill in the art. The operating system (234) and the cloud-based storage array services module (226) in the example of FIG. 2 are shown in RAM (168), but many components of such software typically are stored in non-volatile memory also, such as, for example, on a disk drive (224). Likewise, the modules depicted in RAM (238, 240) of the storage array (102) and client-side user computer (204) may be stored in non-volatile memory.

The storage array services provider (176) of FIG. 2 also includes disk drive adapter (222) coupled through an expansion bus and bus adapter (212) to the processor (210) and other components of the storage array services provider (176). Disk drive adapter (222) connects non-volatile data storage to the storage array services provider (176) in the form of disk drive (224). Disk drive adapters may be implemented in a variety of ways including as SATA (Serial Advanced Technology Attachment) adapters, PATA (Parallel ATA) adapters, Integrated Drive Electronics ('IDE') adapters, Small Computer System Interface ('SCSI') adapters, and others as will occur to those of skill in the art. Non-volatile computer memory also may be implemented as an optical disk drive, electrically erasable programmable read-only memory (so-called 'EEPROM' or 'Flash' memory), RAM drives, and so on, as will occur to those of skill in the art.

The example storage array services provider (176) of FIG. 2 includes one or more input/output ('I/O') adapters (216). I/O adapters implement user-oriented input/output through, for example, software drivers and computer hardware for controlling output to display devices such as computer display screens, as well as user input from user input devices (220) such as keyboards and mice. The example storage array services provider (176) of FIG. 2 also includes a video adapter (208), which is an example of an I/O adapter specially designed for graphic output to a display device (206) such as a display screen or computer monitor. Video adapter (208) is connected to the processor (210) through a high speed video bus.

The example storage array services provider (176) of FIG. 2 includes a communications adapter (218) for data communications with the storage arrays (102) through the network (160). Such data communications may be carried out through data communications networks such as IP data communications networks, and in other ways as will occur to those of skill in the art. Communications adapters implement the hardware level of data communications through which one computer sends data communications to another computer, directly or through a data communications network. Examples of such communications adapters useful include modems for wired dial-up communications, Ethernet (IEEE 802.3) adapters for wired data communications, and 802.11 adapters for wireless data communications.

Readers of skill in the art will recognize that the components of the storage array services provider (176) as depicted in FIG. 2 are example computing components only. Such a storage array services provider (176) may be configured in various ways including, for example, as a server. Such a server may not include the I/O adapters, the driver adapters, display devices, video adapters and the like.

Figure 3:
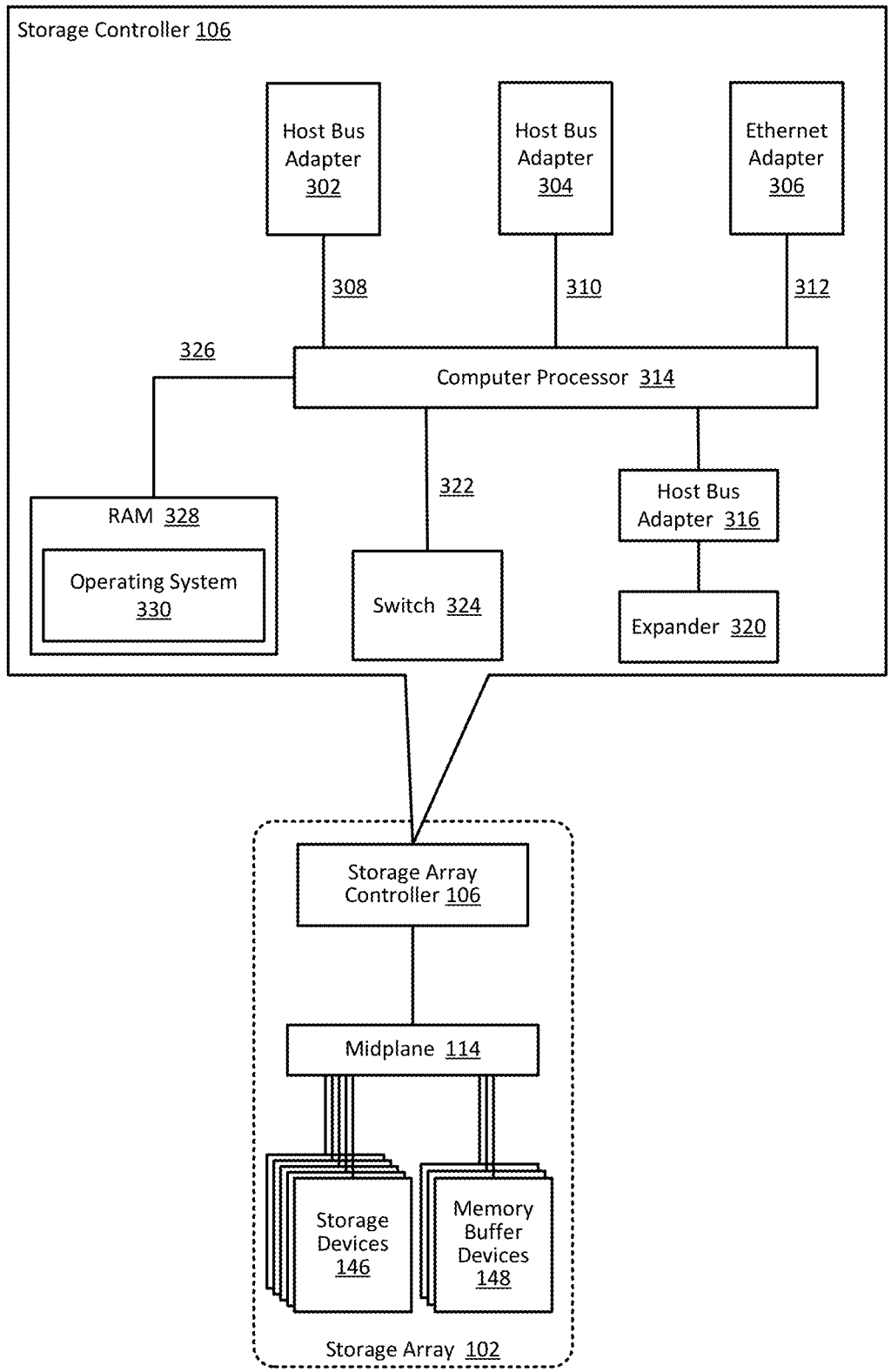
FIG. 3 sets forth a block diagram of a storage array controller useful in placing workloads in a multi-array system according to embodiments of the present disclosure.

As mentioned above, a storage array (102) may also be implemented, at least to some extent, as a computer. For further explanation, therefore, FIG. 3 sets forth a block diagram of a storage array controller (106) useful in placing workloads in a multi-array system according to embodiments of the present disclosure. The storage array controller (106) of FIG. 3 is similar to the storage array controllers depicted in FIG. 1, as the storage array controller (106) of FIG. 3 is communicatively coupled, via a midplane (114), to one or more storage devices (146) and to one or more memory buffer devices (148) that are included as part of a storage array (102). The storage array controller (106) may be coupled to the midplane (114) via one or more data communications links and the midplane (114) may be coupled to the storage devices (146) and the memory buffer devices (148) via one or more data communications links. Such data communications links may be embodied, for example, as Peripheral Component Interconnect Express ('PCIe') bus.

The storage array controller (106) of FIG. 3 includes at least one computer processor (314) or 'CPU' as well as random access memory (RAM') (328). The computer processor (314) may be connected to the RAM (328) via a data communications link (326), which may be embodied as a high speed memory bus such as a Double-Data Rate 4 ('DDR4') bus or other memory bus.

Stored in RAM (328) is an operating system (330). Examples of operating systems useful in storage array controllers (106) according to embodiments of the present disclosure include UNIX™, Linux™, Microsoft Windows™, and others as will occur to those of skill in the art. Readers will appreciate that while the operating system (330) in the example of FIG. 3 is shown in RAM (328), many components of such software may also be stored in non-volatile memory such as, for example, on a disk drive, on a solid-state drive, and so on.

The storage array controller (106) of FIG. 3 also includes a plurality of host bus adapters (302, 304, 306) that are coupled to the processor (314) via a data communications link (308, 310, 312). Each host bus adapter (302, 304, 306) may be embodied as a module of computer hardware that connects the host system (i.e., the storage array controller) to other network and storage devices. Each of the host bus adapters (302, 304, 306) of FIG. 3 may be embodied, for example, as a Fibre Channel adapter that enables the storage array controller (106) to connect to a SAN, as an Ethernet adapter that enables the storage array controller (106) to connect to a LAN, and so on. Each of the host bus adapters (302, 304, 306) may be coupled to the computer processor (314) via a data communications link (308, 310, 312) such as, for example, a PCIe bus.

The storage array controller (106) of FIG. 3 also includes a host bus adapter (316) that is coupled to an expander (320). The expander (320) depicted in FIG. 3 may be embodied as a module of computer hardware utilized to attach a host system to a larger number of storage devices than would be possible without the expander (320). The expander (320) depicted in FIG. 3 may be embodied, for example, as a SAS expander utilized to enable the host bus adapter (316) to attach to storage devices in an embodiment where the host bus adapter (316) is embodied as a SAS controller.

The storage array controller (106) of FIG. 3 also includes a switch (324) that is coupled to the computer processor (314) via a data communications link (322). The switch (324) of FIG. 3 may be embodied as a computer hardware device that can create multiple endpoints out of a single endpoint, thereby enabling multiple devices to share what was initially a single endpoint. The switch (324) of FIG. 3 may be embodied, for example, as a PCIe switch that is coupled to a PCIe bus and presents multiple PCIe connection points to the midplane (114).

The storage array controller (106) of FIG. 3 can also include a data communications link for coupling the storage array controller (106) to other storage array controllers. Such a data communications link may be embodied, for example, as a QuickPath Interconnect ('QPI') interconnect, as PCIe non-transparent bridge ('NTB') interconnect, and so on. Readers will recognize that the components, protocols, adapters, and architectures described above are for illustration only, not limitation. Such a storage array controller may be implemented in a variety of different ways, each of which is well within the scope of the present disclosure.

Figure 4:
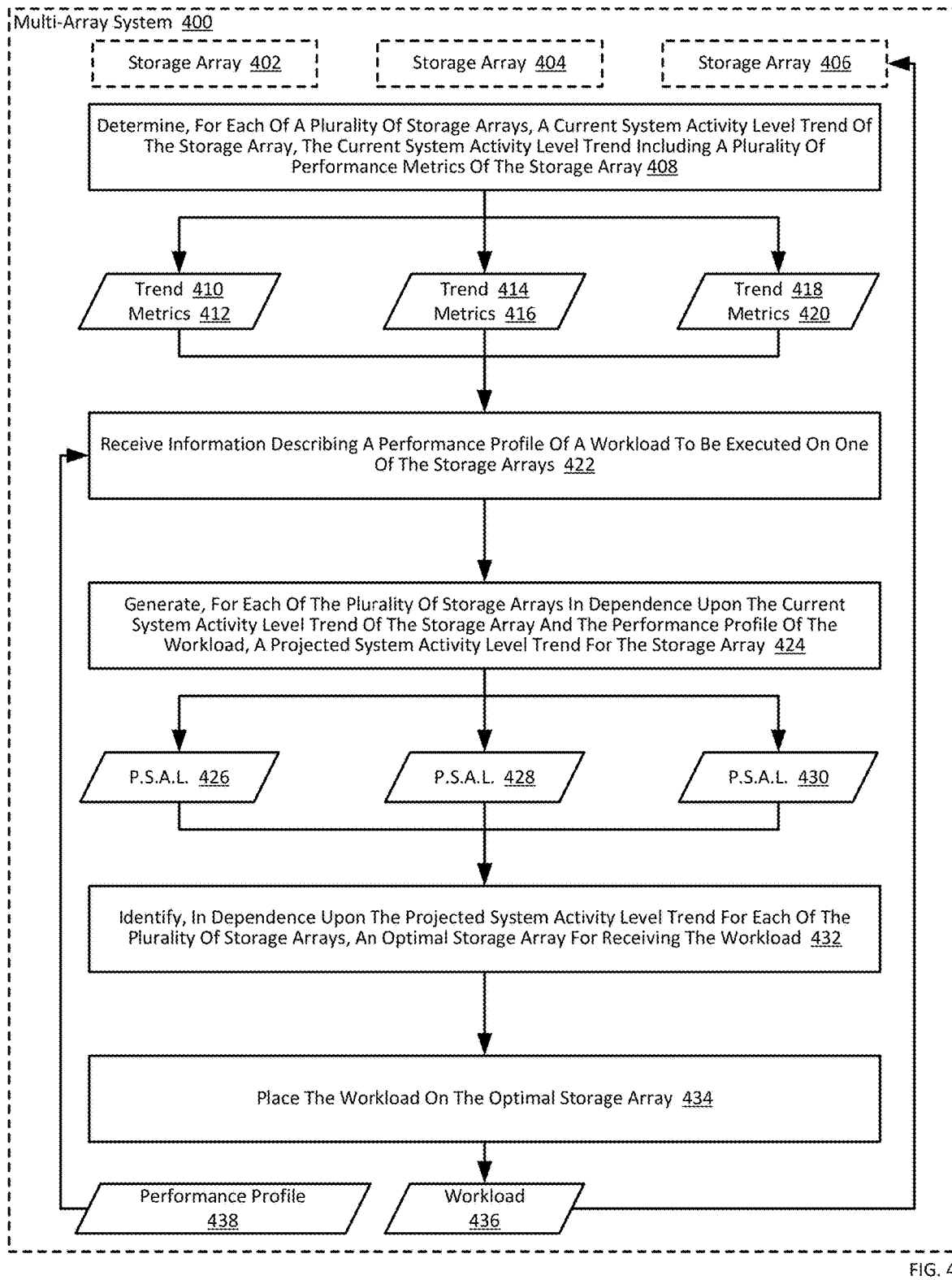
FIG. 4 sets forth an example method of placing workloads in a multi-array system comprising a plurality of storage arrays according to embodiments of the present disclosure.

For further explanation, FIG. 4 sets forth an example method of placing workloads in a multi-array system (400) comprising a plurality of storage arrays (402, 404, 406) according to embodiments of the present disclosure. Each of the storage arrays (402, 404, 406) depicted in FIG. 4 may be similar to the storage arrays described above with reference to FIGS. 1-3. Although the example depicted in FIG. 4 includes an embodiment where the multi-array system (400) includes three storage arrays (402, 404, 406), the multi-array system (400) may include fewer or additional storage arrays, so long as two or more storage arrays are included in the multi-array system (400).

The example method depicted in FIG. 4 includes determining (408), for each of a plurality of storage arrays (402, 404, 406), a current system activity level trend (410, 414, 418) of the storage array (402, 404, 406). The current system activity level trend (410, 414, 418) can include information identifying the current utilization of a plurality of system resources as well as information identifying the trend of resource utilization for a plurality of system resources. The current system activity level trend (410, 414, 418) can include, for example, information identifying the amount of storage space within a particular storage array (402, 404, 406) that is currently being utilized as well as information identifying the rate at which the storage space utilization within a particular storage array (402, 404, 406) is increasing or decreasing.

In the example method depicted in FIG. 4, the current system activity level trend (410, 414, 418) includes a plurality of performance metrics (412, 416, 420) of the storage array (402, 404, 406). The plurality of performance metrics (412, 416, 420) can include, for example, performance metrics (412, 416, 420) used to quantify the usage of processing resources (e.g., CPU cycles being utilized, percentage of CPU utilization for CPUs in a particular storage arrays, and so on), performance metrics (412, 416, 420) used to quantify the usage of non-volatile storage resources, performance metrics (412, 416, 420) used to quantify the usage of volatile memory resources, performance metrics (412, 416, 420) used to quantify the usage of networking resources, and so on. The plurality of performance metrics (412, 416, 420) can also include performance metrics used to identify how well a particular storage array (402, 404, 406) is performing such as, for example, performance metrics used to quantify the number of IOPS serviced by a particular storage array (402, 404, 406), performance metrics used to quantify the read or write latency provided by a particular storage array (402, 404, 406), performance metrics used to quantify the extent to which data stored on a particular storage array (402, 404, 406) is being deduplicated, compressed, or otherwise reduced, and so on.

In the example method depicted in FIG. 4, determining (408) a current system activity level trend (410, 414, 418) for each of a plurality of storage arrays (402, 404, 406) may be carried, for example, by periodically monitoring the plurality of performance metrics (412, 416, 420) and determining the rate at which each monitored performance metric (412, 416, 420) is changing over time. Monitoring the plurality of performance metrics (412, 416, 420) and determining the rate at which each monitored performance metric (412, 416, 420) is changing over time may be carried out, for example, by a centralized component within the multi-array system (400) such as a system management module executing on a system management server.

The example method depicted in FIG. 4 also includes receiving (422) a performance profile (438) of a workload (436) to be executed on one of the storage arrays (402, 404, 406). The performance profile (438) of a workload (436) to be executed on one of the storage arrays (402, 404, 406) may include, for example, information identifying an expected amount of processing resources to be utilized when executing the workload (436), information identifying the amount of non-volatile storage resources expected to be utilized when executing the workload (436), information identifying the amount of volatile memory resources expected to be utilized when executing the workload (436), the number of IOPS expected to be generated when executing the workload (436), and so on. The performance profile (438) of the workload (436) may be generated, for example, by monitoring the execution of the workload (436) on another storage array, by identifying similar workloads being executed on the storage array and inferring that executing the workload (436) will be similar, and so on.

The example method depicted in FIG. 4 also includes generating (424), for each of the plurality of storage arrays (402, 404, 406) in dependence upon the current system activity level trend (410, 414, 418) of the storage array (402, 404, 406) and the performance profile (438) of the workload (436), a projected system activity level (426, 428, 430) trend for the storage array (402, 404, 406). The projected system activity level (426, 428, 430) trend for each storage array (402, 404, 406) can include information identifying the projected utilization of a plurality of system resources as well as information identifying the projected trend of resource utilization for a plurality of system resources that would occur if the workload (436) were executed by the storage array (402, 404, 406). The projected system activity level (426, 428, 430) trend for each storage array (402, 404, 406) can include, for example, information identifying the projected amount of storage space within a particular storage array (402, 404, 406) that would be utilized as well as information identifying the projected rate at which the storage space utilization within a particular storage array (402, 404, 406) is expected to increase or decrease if the workload (436) were executed by the storage array (402, 404, 406).

In the example method depicted in FIG. 4, the projected system activity level (426, 428, 430) trend identifies an expected impact to the performance metrics (412, 416, 420) of the storage array (402, 404, 406) created by placing the workload (436) on the storage array (402, 404, 406). As described above, the plurality of performance metrics (412, 416, 420) can include, for example, performance metrics (412, 416, 420) used to quantify the usage of processing resources, non-volatile storage resources, volatile memory resources, networking resources, and so on. The plurality of performance metrics (412, 416, 420) can also include performance metrics used to identify how well a particular storage array (402, 404, 406) is performing such as, for example, performance metrics used to quantify the number of IOPS serviced by a particular storage array (402, 404, 406), performance metrics used to quantify the read or write latency provided by a particular storage array (402, 404, 406), performance metrics used to quantify the extent to which data stored on a particular storage array (402, 404, 406) is being deduplicated, compressed, or otherwise reduced, and so on.

In the example method depicted in FIG. 4, the expected impact to the performance metrics (412, 416, 420) of the storage array (402, 404, 406) that is expected to be created by placing the workload (436) on the storage array (402, 404, 406) may be expressed, for example, as an absolute value that represents the expected value for each of the performance metrics (412, 416, 420) that is expected to be created by placing the workload (436) on the storage array (402, 404, 406). In an alternative embodiment, the expected impact to the performance metrics (412, 416, 420) of the storage array (402, 404, 406) that is expected to be created by placing the workload (436) on the storage array (402, 404, 406) may be expressed as a relative value that represents the expected change to each of the performance metrics (412, 416, 420) that is expected to be created by placing the workload (436) on the storage array (402, 404, 406).

In the example method depicted in FIG. 4, generating (424) the projected system activity level (426, 428, 430) trend for the storage array (402, 404, 406) in dependence upon the current system activity level trend (410, 414, 418) of the storage array (402, 404, 406) and the performance profile (438) of the workload (436) may be carried out, for example, by summing one or more performance metrics (412, 416, 420) associated with the current system activity level trend (410, 414, 418) of the storage array (402, 404, 406) with the corresponding expected impact to the performance metrics (412, 416, 420) of the storage array (402, 404, 406) created by placing the workload (436) on the storage array (402, 404, 406).

Consider an example in which the performance metrics (412) for a particular storage array (402) indicate that the current system activity level trend (410) of the storage array (402) has consumed 500 TB of data storage and that such data storage consumption is expanding at a rate of 1 TB per day. Assume in such an example that the corresponding expected impact to the performance metrics (412) of the storage array (402) created by placing the workload (436) on the storage array (402) indicate that the new workload would immediately consume 10 TB of data storage and that such consumption is expected to expand at a rate of 0.1 TB per day. In such an example, the projected system activity level (426) trend for the storage array (402) would indicate that placing the workload (436) on the storage array (402) would indicate that data storage consumption within the storage array (402) would be at a level of 510 TB and that such data storage consumption is expected to expand at a rate of 1.1 TB per day. Readers will appreciate that similar calculations may be carried out for each of the storage arrays (402, 404, 406) and for a plurality of performance metrics.

The example method depicted in FIG. 4 also includes identifying (432), in dependence upon the projected system activity level (426, 428, 430) trend for each of the plurality of storage arrays (402, 404, 406), an optimal storage array for receiving the workload (436). The optimal storage array for receiving the workload (436) may be embodied, for example, as the storage array (402, 404, 406) that has sufficient resources to support the workload (436) for the longest period of time, as the storage array (402, 404, 406) that has sufficient resources to provide the best performance to the workload (436), as the storage array (402, 404, 406) that receives the best score when applying some predetermined selection formula, and so on.

In the example method depicted in FIG. 4, identifying (432) the optimal storage array for receiving the workload (436) in dependence upon the projected system activity level (426, 428, 430) trend for each of the plurality of storage arrays (402, 404, 406) may be carried out, for example, by applying a predetermined selection formula that utilizes the projected system activity level (426, 428, 430) trend for each of the plurality of storage arrays (402, 404, 406) as an input. In such an example, the predetermined selection formula may be configured to generate a score for each storage array (402, 404, 406) that can be used as an indication of how well a particular storage array can support a particular workload (436). Consider the following predetermined selection formula as an example:

$$\text{Score} = (S_{PSAL}/S_{AVAIL}) + (PC_{PSAL}/PC_{AVAIL}), \text{ where:}$$

$S_{PSAL}$ represents the amount of storage to be consumed as specified in the projected system activity level, $S_{AVAIL}$ represents the amount of storage available in the storage array, $PC_{PSAL}$ represents the amount of processor cycles storage to be consumed as specified in the projected system activity level, and $PC_{AVAIL}$ represents the amount of processor cycles available in the storage array. In such an example, the storage array with the lowest score may be identified (432) as being the optimal storage array for receiving the workload (436).

Readers will appreciate that the predetermined selection formula described above is included for illustrative purposes only. Embodiments of the present disclosure may include other predetermined selection formulas that take into account other variables or that apply a weighting to each parameter within the predetermined selection formula, and so on. Readers will appreciate that rather than utilizing a predetermined selection formula, selection logic may be utilized that applies selection criteria. For example, such selection logic may apply a first selection criterion that eliminates from consideration any storage array that does not have enough storage to support the amount of storage to be consumed as specified in the projected system activity level for a predetermined period of time. Such selection logic may apply a second selection criterion that eliminates from consideration any storage array that does not have enough processing resources to support the amount of processing resources to be consumed as specified in the projected system activity level. In such an example, an elaborate series of selection criterion may be applied until only a single storage array remains as a candidate, until a predetermined number or storage arrays remain as candidates, and so on.

The example method depicted in FIG. 4 also includes placing (434) the workload (436) on the optimal storage array. In the example method depicted in FIG. 4, placing (434) the workload (436) on the optimal storage array may be carried out by installing all necessary applications that are needed to execute the workload (436) onto the optimal storage array, storing all necessary data that is needed to execute the workload (436) onto the optimal storage array, initiating any processes that are needed to execute the workload (436) on the optimal storage array, and so on.

Figure 5:
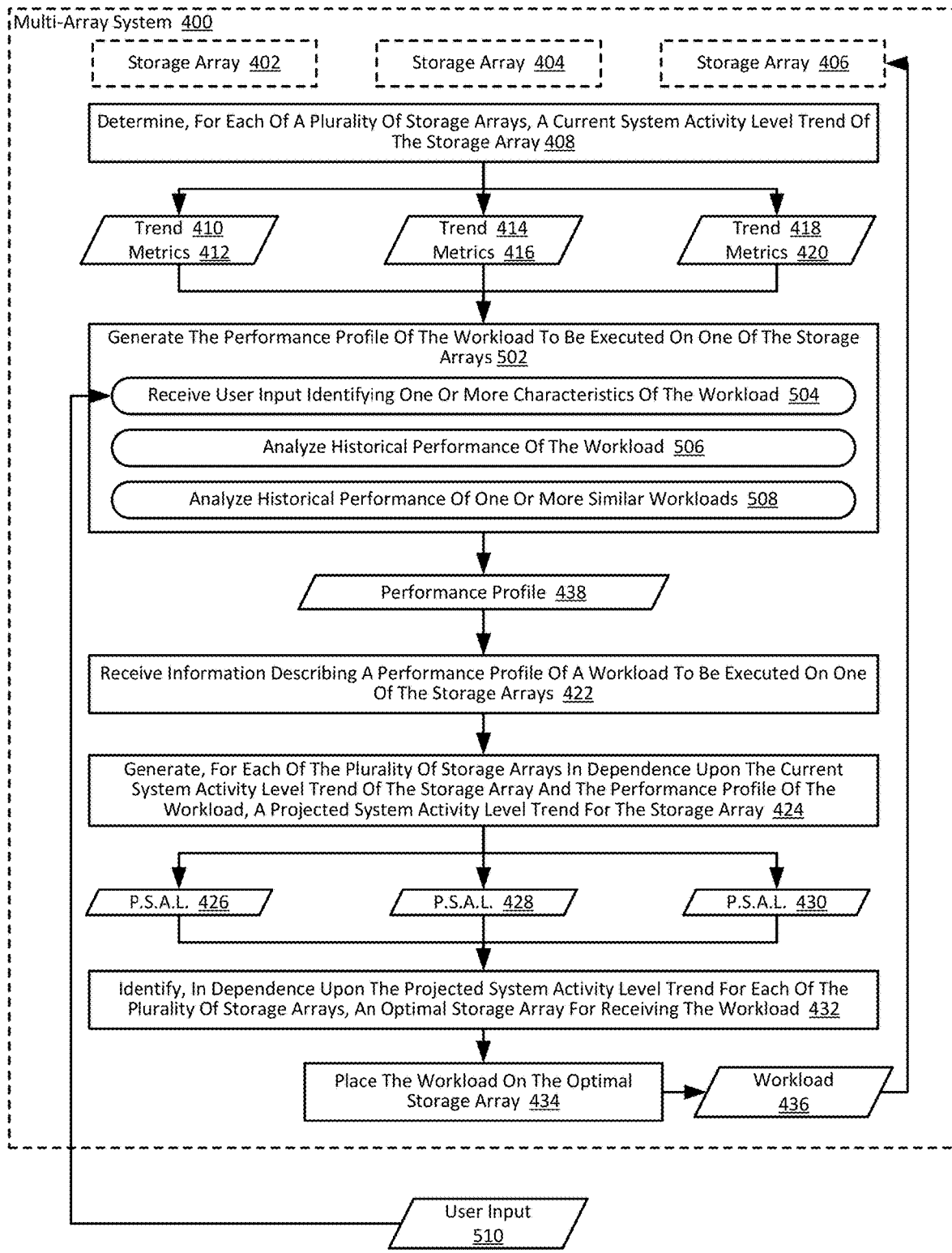
FIG. 5 sets forth an additional example method of placing workloads in a multi-array system comprising a plurality of storage arrays according to embodiments of the present disclosure.

For further explanation, FIG. 5 sets forth an additional example method of placing workloads in a multi-array system (400) comprising a plurality of storage arrays (402, 404, 406) according to embodiments of the present disclosure. The example method depicted in FIG. 5 is similar to the example method depicted in FIG. 4, as the example method depicted in FIG. 5 also includes determining (408) a current system activity level trend (410, 414, 418) for each storage array (402, 404, 406), receiving (422) a performance profile (438) of a workload (436) to be executed on one of the storage arrays (402, 404, 406), generating (424) a projected system activity level (426, 428, 430) trend for each storage array (402, 404, 406), identifying (432) an optimal storage array for receiving the workload (436), and placing (434) the workload (436) on the optimal storage array.

The example method depicted in FIG. 5 also includes generating (502) the performance profile (438) of the workload (436) to be executed on one of the storage arrays (402, 404, 406). In the example method depicted in FIG. 5, generating (502) the performance profile (438) of the workload (436) to be executed on one of the storage arrays (402, 404, 406) can include receiving (504) user input (510) identifying one or more characteristics of the workload (436). The user input (510) identifying one or more characteristics of the workload (436) may be received (504), for example, via a user interface presented to a user such as a system administrator. Such a user interface may present options to the user to enter values for information such as an estimate of the number of TOPS that must be serviced to execute the workload (436), an estimate of the amount of storage that will be consumed by executing the workload (436), and so on. The user interface may also present options to the user that enable the user to select from a predefined set of options (e.g., a field that allows a user to select the type of application supported by executing the workload from a predetermined list of application types).

The user input (510) identifying one or more characteristics of the workload (436) may include information that is used to make inferences that are used to generate the performance profile (438) of the workload. For example, the user input (510) identifying one or more characteristics of the workload (436) may include information such as the type of application (e.g., a database application) that is supported by executing the workload (436). In such an example, generating (502) the performance profile (438) of the workload (436) may be carried out by gathering performance metrics for other workloads whose execution supports similar applications and constructing a performance profile with performance metrics that are similar to the performance metrics for other workloads whose execution supports similar applications.

Readers will appreciate that the user input (510) identifying one or more characteristics of the workload (436) may also include information that is used to populate various components of the performance profile (438) of the workload (438). For example, the user input (510) identifying one or more characteristics of the workload (436) may include information such as an estimate of the number of IOPS that must be serviced to execute the workload (436), an estimate of the amount of storage that will be consumed by executing the workload (436), and so on. In such an example, generating (502) the performance profile (438) of the workload (436) may be carried out by constructing a performance profile with performance metrics whose values are similar to the information contained in the user input (510) identifying one or more characteristics of the workload (436).

In the example method depicted in FIG. 5, generating (502) the performance profile (438) of the workload (436) to be executed on one of the storage arrays (402, 404, 406) can also include analyzing (506) historical performance of the workload (436). Readers will appreciate that the workload (436) to be executed on one of the storage arrays (402, 404, 406) may be a workload that is already executing on one of the storage arrays (402, 404, 406) as part of an effort to rebalance workloads and ensure that workloads are distributed properly. As such, the historical performance of the workload (436) itself may be analyzed (506) and a performance profile (438) may be generated (502) that includes performance metrics that are similar to those previously exhibited by the workload (436).

In the example method depicted in FIG. 5, generating (502) the performance profile (438) of the workload (436) to be executed on one of the storage arrays (402, 404, 406) can also include analyzing (508) historical performance of one or more similar workloads. A workload may be similar to the workload (436) to be executed on one of the storage arrays (402, 404, 406), for example, because executing each workload supports the same type of application (e.g., a database application), because each workload was initiated by the same process or application, because each workload is identified as being similar by a user such as a system administrator, because each workload is identified as being by a predetermined set of rules, and so on. In such an example, the historical performance of one or more similar workloads may be analyzed (508) and a performance profile (438) may be generated (502) that includes performance metrics that are similar to those exhibited by the similar workloads.

Although the examples described above relate to embodiments where generating (502) the performance profile (438) of the workload (436) to be executed on one of the storage arrays (402, 404, 406) are carried out by separately receiving (504) user input (510) identifying one or more characteristics of the workload (436), analyzing (506) historical performance of the workload (436), or analyzing (508) historical performance of one or more similar workloads, readers will appreciate that embodiments are contemplated where generating (502) the performance profile (438) of the workload (436) is carried out by a combination of such approaches. For example, generating (502) the performance profile (438) of the workload (436) may be carried out by receiving (504) user input (510) identifying one or more characteristics of the workload (436), analyzing (506) historical performance of the workload (436), and analyzing (508) historical performance of one or more similar workloads. Likewise, generating (502) the performance profile (438) of the workload (436) may be carried out by receiving (504) user input (510) identifying one or more characteristics of the workload (436) and analyzing (506) historical performance of the workload (436), by analyzing (506) historical performance of the workload (436) and analyzing (508) historical performance of one or more similar workloads, or by any other combination of the approaches described herein.

Figure 6:
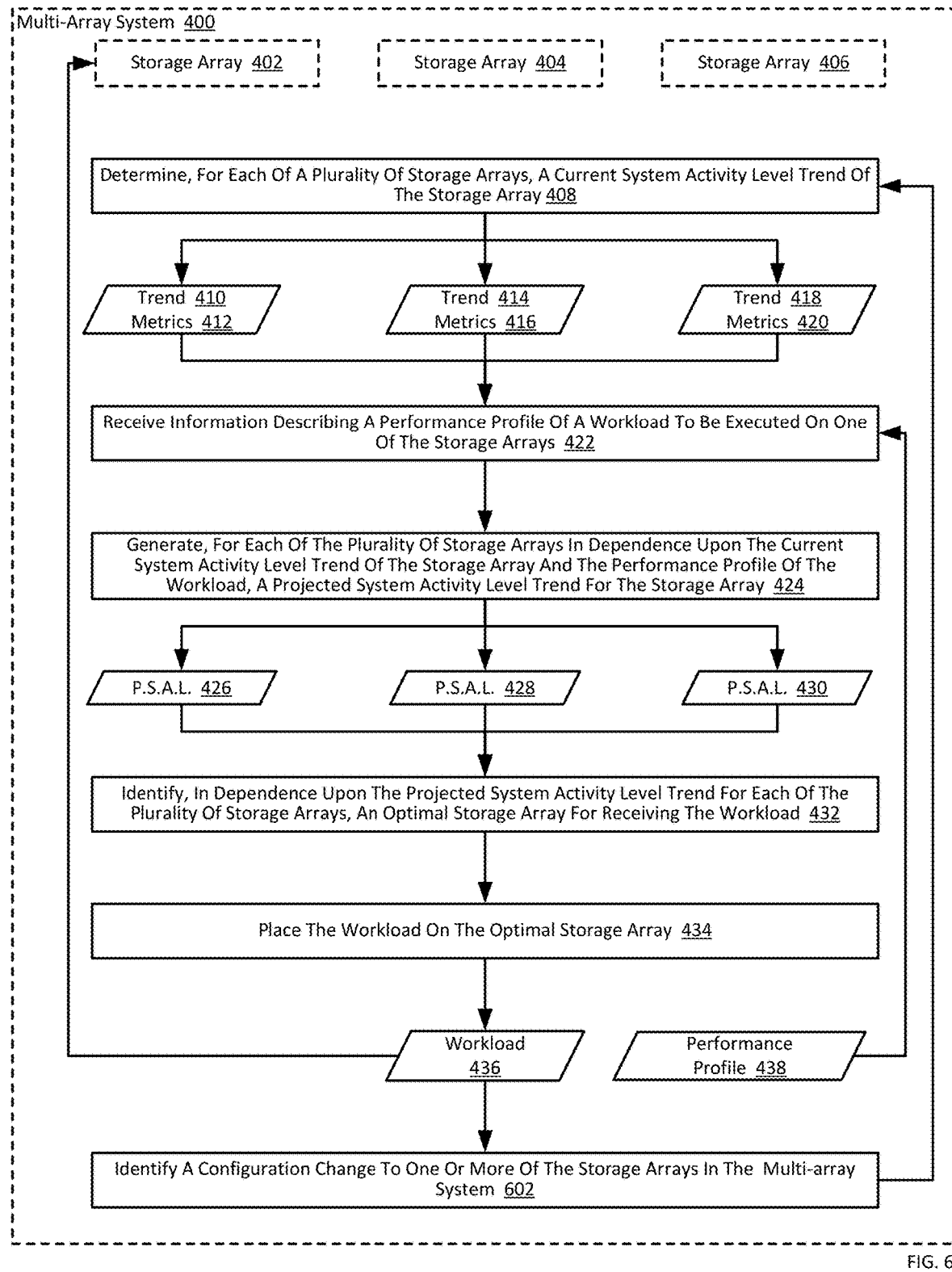
FIG. 6 sets forth an additional example method of placing workloads in a multi-array system comprising a plurality of storage arrays according to embodiments of the present disclosure.

For further explanation, FIG. 6 sets forth an additional example method of placing workloads in a multi-array system (400) comprising a plurality of storage arrays (402, 404, 406) according to embodiments of the present disclosure. The example method depicted in FIG. 6 is similar to the example method depicted in FIG. 4, as the example method depicted in FIG. 6 also includes determining (408) a current system activity level trend (410, 414, 418) for each storage array (402, 404, 406), receiving (422) a performance profile (438) of a workload (436) to be executed on one of the storage arrays (402, 404, 406), generating (424) a projected system activity level (426, 428, 430) trend for each storage array (402, 404, 406), identifying (432) an optimal storage array for receiving the workload (436), and placing (434) the workload (436) on the optimal storage array.

The example method depicted in FIG. 6 also includes identifying (602) a configuration change to one or more of the storage arrays (402, 404, 406) in the multi-array system (400). A configuration change to one or more of the storage arrays (402, 404, 406) in the multi-array system (400) may represent the occurrence of any event that results in a change to the current system activity level trend (410, 414, 418) of a particular storage array (402, 404, 406). Such a configuration change to a particular storage array (402, 404, 406) can include a change to the computer hardware components within the storage array such as, for example, adding new storage devices to the storage array, adding a new storage array controller to the storage array, removing storage devices from the storage array (e.g., as the result of a storage device failing or otherwise), and so on. The configuration change to a particular storage array (402, 404, 406) can also include a change to the computer software components within the storage array such as, for example, updating system software, updating device drivers, and so on. Furthermore, a configuration change to a particular storage array (402, 404, 406) can also include a change to the workloads serviced by a particular storage array such as, for example, removing a workload from a storage array, adding a workload to a storage array, and so on. Readers will appreciate that because a configuration change to a particular storage array (402, 404, 406) results in a change to the current system activity level trend (410, 414, 418) of a particular storage array (402, 404, 406), steps 408, 422, 424, 432, and 434 that are depicted in FIG. 6 may need to be carried out again so as to ensure that workloads are properly placed in view of the changes to the current system activity level trend (410, 414, 418) of a particular storage array (402, 404, 406).

Figure 7:
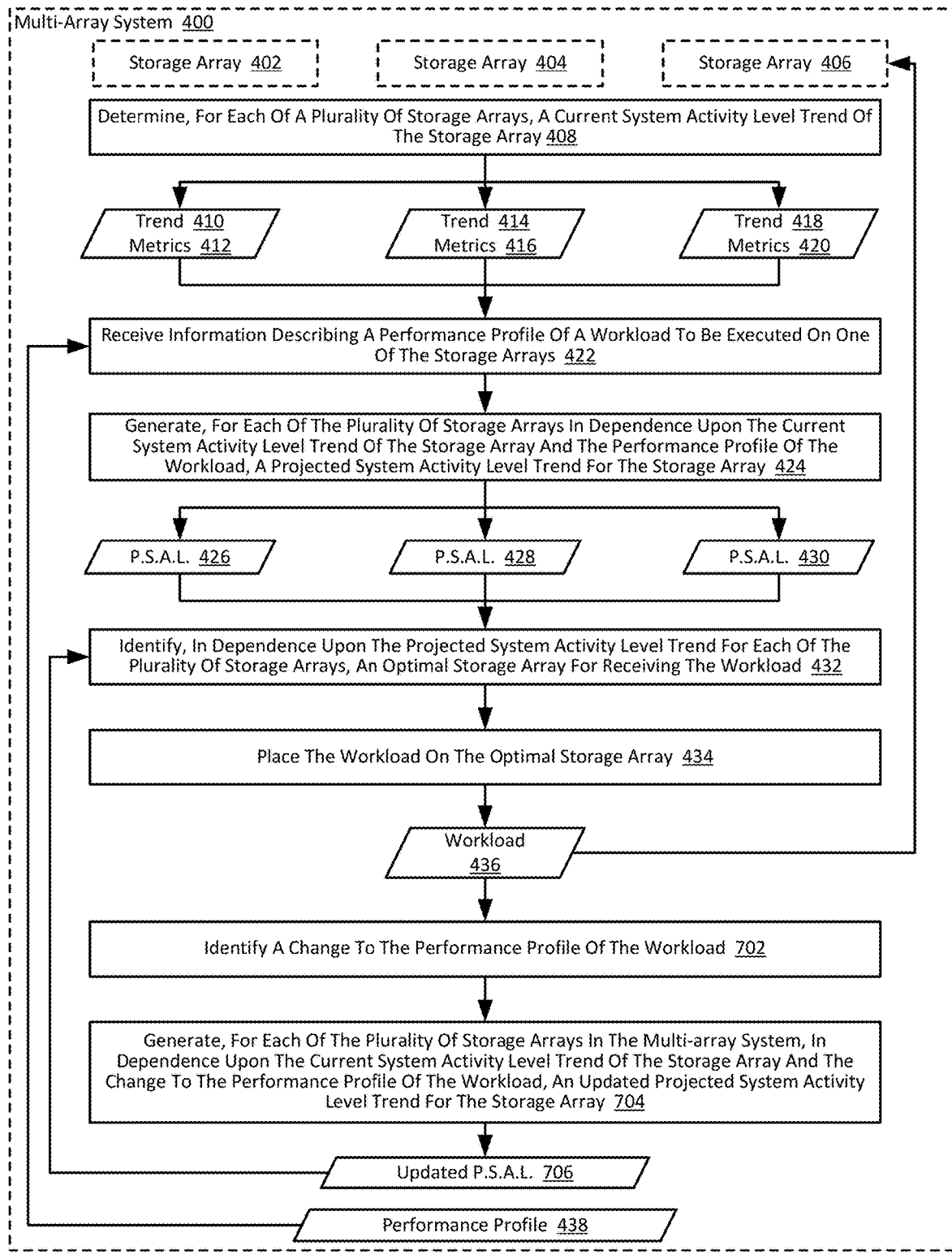
FIG. 7 sets forth an additional example method of placing workloads in a multi-array system comprising a plurality of storage arrays according to embodiments of the present disclosure.

For further explanation, FIG. 7 sets forth an additional example method of placing workloads in a multi-array system (400) comprising a plurality of storage arrays (402, 404, 406) according to embodiments of the present disclosure. The example method depicted in FIG. 7 is similar to the example method depicted in FIG. 4, as the example method depicted in FIG. 7 also includes determining (408) a current system activity level trend (410, 414, 418) for each storage array (402, 404, 406), receiving (422) a performance profile (438) of a workload (436) to be executed on one of the storage arrays (402, 404, 406), generating (424) a projected system activity level (426, 428, 430) trend for each storage array (402, 404, 406), identifying (432) an optimal storage array for receiving the workload (436), and placing (434) the workload (436) on the optimal storage array.

The example method depicted in FIG. 7 also includes identifying (702) a change to the performance profile (438) of the workload (436). The change to the performance profile (438) of the workload (436) may represent the occurrence of any event that causes the amount of underlying storage array resources that are required to execute the workload (436) to change. A change to the performance profile (438) of the workload (436) may occur, for example, over time as the characteristics of the workload change. Consider an example in which executing a particular workload supports maintaining a database. In such an example, if the database grows or shrinks over time, if the database is accessed more frequently or less frequently over time, the performance profile (438) of the workload (436) may also change. A change to the performance profile (438) of the workload (436) may also occur, for example, due to changes to a software application that is supported by the execution of a workload. Continuing with the example in which executing a particular workload supports maintaining a database, if an update occurs to the database software (e.g., a new version of the database is installed), the performance profile (438) of the workload (436) may also change. In the example method depicted in FIG. 7, identifying (702) a change to the performance profile (438) of the workload (436) may be carried out by periodically monitoring the amount of underlying storage array resources that are required to execute the workload (436) and comparing the monitored data to the performance profile (438) of the workload (436). When a deviation between the monitored data and the performance profile (438) of the workload (436) reaches a predetermined threshold or exists for a threshold period of time, a determination may be made that the performance profile (438) of the workload (436) has changed.

The example method depicted in FIG. 7 also includes generating (704), for each of the plurality of storage arrays (402, 404, 406) in the multi-array system (400), in dependence upon the current system activity level trend (410, 412, 414) of the storage array (402, 404, 406) and the change to the performance profile (438) of the workload (436), an updated projected system activity level (706) trend for the storage array (402, 404, 406). Generating (704) an updated projected system activity level (706) trend for a particular storage array (402, 404, 406) in dependence upon the current system activity level trend (410, 412, 414) of the storage array (402, 404, 406) and the change to the performance profile (438) of the workload (436) may be carried out, for example, by summing one or more performance metrics (412, 416, 420) associated with the current system activity level trend (410, 414, 418) of the storage array (402, 404, 406) with the corresponding performance metric of the updated performance profile (438) of the workload (436).

Consider the example described above with reference to FIG. 4 in which the performance metrics (412) for a particular storage array (402) indicate that the current system activity level trend (410) of the storage array (402) has consumed 500 TB of data storage and that such data storage consumption is expanding at a rate of 1 TB per day. In such an example, the corresponding expected impact to the performance metrics (412) of the storage array (402) created by placing the workload (436) on the storage array (402) indicate that the new workload would immediately consume 10 TB of data storage and that such consumption is expected to expand at a rate of 0.1 TB per day. In such an example, the projected system activity level (426) trend for the storage array (402) would indicate that placing the workload (436) on the storage array (402) indicated that data storage consumption within the storage array (402) would be at a level of 510 TB and that such data storage consumption is expected to expand at a rate of 1.1 TB per day. If a change to the performance profile (438) of the workload (436) was identified (702) such that executing the workload (436) was expected to consume 0.5 TB of data storage per day, the updated projected system activity level (706) trend for the storage array (402) would indicate that data storage consumption is expected to expand at a rate of 1.5 TB per day. Readers will appreciate that once an updated projected system activity level (706) trend has been generated (704) for each the storage arrays (402, 404, 406), steps 432 and 434 that are depicted in FIG. 7 may need to be carried out again so as to ensure that workloads are properly placed in view of the changes to the performance profile (438) of the workload (436).

Example embodiments of the present invention are described largely in the context of a fully functional computer system for placing workloads in a multi-array system. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the example embodiments described in this specification are oriented to software installed and executing on computer hardware, nevertheless, alternative embodiments implemented as firmware or as hardware are well within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method comprising:
   determining, for each of a plurality of storage arrays in a multi-array system, a current system activity level trend including a plurality of performance metrics of each respective storage array;
   generating a performance profile of a workload to be executed on one of the plurality of storage arrays;
   generating, for each of the plurality of storage arrays in dependence upon the current system activity level trend of the storage array and the performance profile of the workload, a projected system activity level trend for each of the plurality of storage arrays;
   identifying a particular storage array among the plurality of storage arrays for receiving the workload by selecting, based on a formula, an optimal storage array among the plurality of arrays with sufficient resources to support the workload for a predetermined period of time based on the projected system activity level trend for each of the plurality of storage arrays; and
   placing the given workload on the particular storage array, including configuring the respective storage array to support execution of the given workload.

2. The method of claim 1, wherein configuring the particular storage array to execute the given workload includes one or more of: installing one or more applications to execute the given workload, storing data usable in executing the workload, or initiating one or more processes to execute the given workload, and wherein generating the performance profile of the workload to be executed on one of the storage arrays further comprises receiving user input identifying one or more characteristics of the workload.

3. The method of claim 1 wherein generating the performance profile of the workload to be executed on one of the storage arrays further comprises analyzing historical performance of the workload.

4. The method of claim 1 wherein generating the performance profile of the workload to be executed on one of the storage arrays further comprises analyzing historical performance of one or more similar workloads.

5. The method of claim 1 further comprising:
   generating, for each of the plurality of storage arrays in the multi-array system, in dependence upon the current system activity level trend of the storage array and a change to the performance profile of the workload, an updated projected system activity level trend for the storage array.

6. The method of claim 1 wherein determining the current system activity level trend of the storage array further comprises:
   determining a rate at which each monitored performance metric is changing.

7. The method of claim 1 wherein generating the projected system activity level trend for the storage array further comprises determining, for a plurality of performance metrics associated with the storage array, projected performance metrics associated with the storage array created by placing the workload on the storage array.

8. A storage system that includes a plurality of storage devices, the storage system including a computer processor and a computer memory, the computer memory including computer program instructions that, when executed by the computer processor, cause the storage system to carry out the steps of:
   determining, for each of a plurality of storage arrays in a multi-array system the current system activity level trend including a plurality of performance metrics of each respective storage array;
   generating a performance profile of a workload to be executed on one of the plurality of storage arrays
   generating, for each of the plurality of storage arrays in dependence upon the current system activity level trend of the storage array and the performance profile of the workload, a projected system activity level trend for the storage array;
   identifying a particular storage array among the plurality of storage arrays for receiving the workload by selecting, based on a formula, an optimal storage array among the plurality of arrays with sufficient resources to support the workload for a predetermined period of time based on the projected system activity level trend for each of the plurality of storage arrays; and
   placing the workload on the particular storage array, including configuring the respective storage array to support execution of the given workload.

9. The storage system of claim 8 wherein generating the performance profile of the workload to be executed on one of the storage arrays further comprises receiving user input identifying one or more characteristics of the workload.

10. The storage system of claim 8 wherein generating the performance profile of the workload to be executed on one of the storage arrays further comprises analyzing historical performance of the workload.

11. The storage system of claim 8 wherein generating the performance profile of the workload to be executed on one of the storage arrays further comprises analyzing historical performance of one or more similar workloads.

12. The storage system of claim 8 further comprising computer program instructions that, when executed by the computer processor, cause the storage system to carry out the steps of:
   generating, for each of the plurality of storage arrays in the multi-array system, in dependence upon the current system activity level trend of the storage array and a change to the performance profile of the workload, an updated projected system activity level trend for the storage array.

13. The storage system of claim 8 further comprising computer program instructions that, when executed by the computer processor, cause the storage system to carry out the steps of:
   determining a rate at which each monitored performance metric is changing.

14. The storage system of claim 8 wherein generating the projected system activity level trend for the storage array further comprises determining, for a plurality of performance metrics associated with the storage array, projected performance metrics associated with the storage array created by placing the workload on the storage array.

15. An apparatus for use in a storage system that includes a plurality of storage devices, the apparatus including a computer processor and a computer memory, the computer memory including computer program instructions that, when executed by the computer processor, cause the storage system to carry out the steps of:
   determining, for each of a plurality of storage arrays in a multi-array system the current system activity level trend including a plurality of performance metrics of each respective storage array;
   generating a performance profile of a workload to be executed on one of the plurality of storage arrays
   generating, for each of the plurality of storage arrays in dependence upon the current system activity level trend of the storage array and the performance profile of the workload, a projected system activity level trend for the storage array;
   identifying a particular storage array among the plurality of storage arrays for receiving the workload by selecting, based on a formula, an optimal storage array among the plurality of arrays with sufficient resources to support the workload for a predetermined period of time based on the projected system activity level trend for each of the plurality of storage arrays; and
   placing the workload on the particular storage array, including configuring the respective storage array to support execution of the given workload.

16. The apparatus of claim 15 wherein generating the performance profile of the workload to be executed on one of the storage arrays further comprises receiving user input identifying one or more characteristics of the workload.

17. The apparatus of claim 15 wherein generating the performance profile of the workload to be executed on one of the storage arrays further comprises analyzing historical performance of the workload.

18. The apparatus of claim 15 wherein generating the performance profile of the workload to be executed on one of the storage arrays further comprises analyzing historical performance of one or more similar workloads.

19. The apparatus of claim 15 further comprising computer program instructions that, when executed by the computer processor, cause the storage system to carry out the steps of:
   generating, for each of the plurality of storage arrays in the multi-array system, in dependence upon the current system activity level trend of the storage array and a change to the performance profile of the workload, an updated projected system activity level trend for the storage array.

20. The apparatus of claim 15 further comprising computer program instructions that, when executed by the computer processor, cause the storage system to carry out the steps of:
   determining a rate at which each monitored performance metric is changing.

* * * * *